United States Patent [19]

Miner

[11] Patent Number: 5,030,304

[45] Date of Patent: Jul. 9, 1991

[54] METHOD OF MANUFACTURE OF COMBINATION TRANSACTION RECORD AND TEAR-OFF FORM

[76] Inventor: Walter Miner, 1314 Good St., Park Ridge, Ill. 60068

[21] Appl. No.: 376,379

[22] Filed: Jul. 6, 1989

Related U.S. Application Data

[62] Division of Ser. No. 216,329, Jul. 7, 1988, Pat. No. 4,869,530.

[51] Int. Cl.[5] ............................................ B32B 31/00

[52] U.S. Cl. .................................... 156/191; 156/267; 156/269; 156/277; 282/9 R; 428/43

[58] Field of Search ............... 156/277, 269, 267, 191; 428/43; 282/9 R

[56] References Cited

U.S. PATENT DOCUMENTS

4,260,444 4/1981 Fowler ................................ 156/269

4,407,524 10/1983 Trautlein ........................... 282/9 R

*Primary Examiner*—John J. Gallagher

*Attorney, Agent, or Firm*—Wallenstein, Wagner & Hattis, Ltd.

[57] ABSTRACT

A multi-entry transaction pad features a plurality of sheets bearing tear-off slips thereon, the sheets being arranged in a stack over a transfer paper in contact with a master record sheet. Peripheral record entry areas on each slip allows sequential entry of transaction-related data thereinto, the entires being recorded immediately thereunder on the master record sheet. The sheets and their slips are offset with respect to each other, and unique transactions-identifying numbers are printed thereon. The slips are staggered in such a way as to be congruent with correspondingly numbered areas on the master record sheet. Offsetting and staggering is arranged so that the record entry area of the next sequential slip is always exposed and in immediate contact with the transfer paper. A relatively large number of tear-off slips are accommodated on a relatively small number of sheets, leading to reduced manufacturing costs and simplification of the manufacturing process. A related manufacturing method is described.

16 Claims, 8 Drawing Sheets

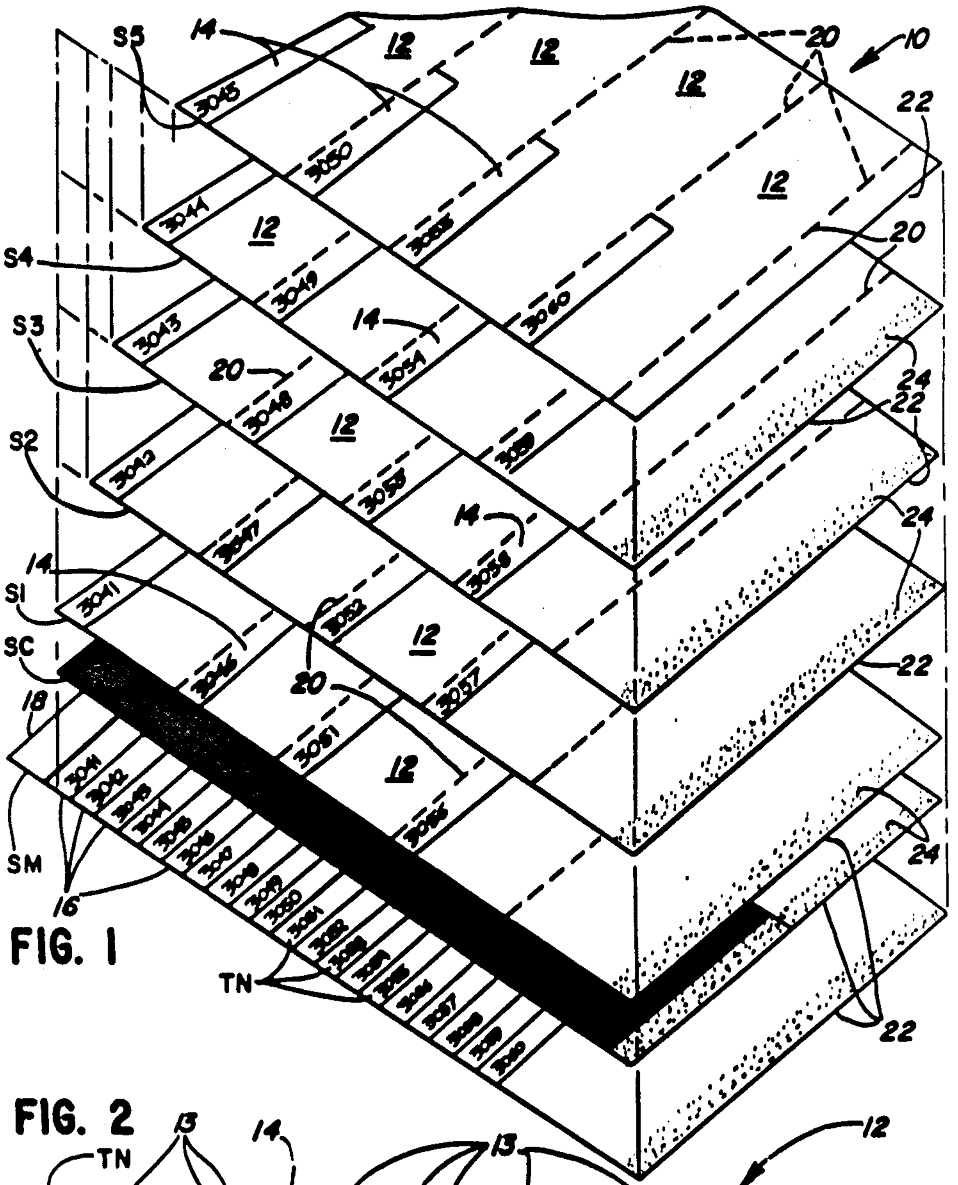
FIG. 1
FIG. 2
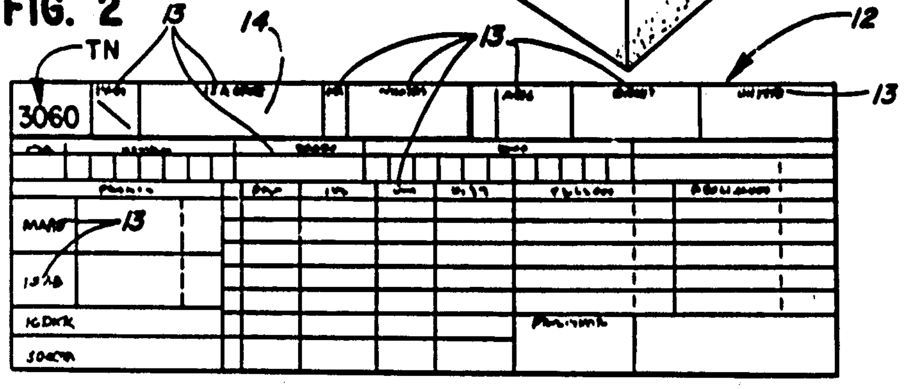

METHOD OF MANUFACTURE OF COMBINATION TRANSACTION RECORD AND TEAR-OFF FORM

This application is a division, of application Ser. No. 216,329, filed July 7, 1988, now U.S. Pat. No. 4,869,530.

DESCRIPTION

1. Technical Area

The printed forms art and method for the fabrication of such forms.

2. Background Art

It is a common feature of business record-keeping to maintain duplicate paper copies of transaction records. Such transaction records are frequently filled out sequentially by various individuals having differing responsibilities with respect to a given transaction. Thus, for example, a receiving clerk will enter certain minimal identifying information on a transaction slip upon receipt of a shipment of merchandise, after which the slip and a copy of the entries thereon may be respectively forwarded to the bookkeeping department and to other departments having associated responsibilities.

To this end, a transaction form was heretofore developed having pre-printed control numbers (transaction numbers) on a given number of sequential tear-off slips overlying one or more carbon paper sheets, these in turn overlying one or more master transaction record sheets. The receiving department clerk thus would enter appropriate information onto a record entry area on one of the slips, tear-off the slip for further processing, and retain the one or more master transaction record sheets which would contain copies of all entries made on the various slips. The transaction record slips were, in one form, individually removably joined at their left-most edges to the one or more master record sheets, and overlaid in vertically offset fashion in much the same manner that shingles are laid on a roof. Thus, the bottommost tear-off slip was located over a portion of a carbon sheet overlying the top portion of a master record sheet, with overlying slips being offset sequentially downward. The record entry areas were located at the top of each individual slip, and the one or more master record sheets were provided with matching record entry areas delineated by printing, each master record sheet record entry region lying immediately below the record entry area of an associated slip. Each record entry area of each master record sheet had a pre-printed transaction number thereon corresponding to a transaction number printed on the slip having its record entry region lying immediately thereabove. In such a system the relevant entry is made in the exposed record entry area of the bottommost slip, automatically being recorded opposite its associated transaction number on the master record sheet, after which this slip is removed and forwarded to the appropriate record handling department. Its next overlying slip is then in contact with the carbon paper below and ready for similar entry. One thus achieves on a given master record sheet a consolidated listing of a great many transactions.

One problem with the foregoing structure is that it is expensive to fabricate and is inherently fragile. The tear-off slips are joined at one edge over a relatively narrow length, making them vulnerable to being accidentally torn, lost or misaligned. Moreover, it is evident from a manufacturing standpoint that such a system of forms is expensive to fabricate, since individual slips must be individually emplaced and attached.

Thus, there is a need for providing a form similar to that just described, but which provides a structure which is not so fragile, and, most important, which can be manufactured at lower cost.

SUMMARY OF THE INVENTION

The method of the invention relates to the manufacture of a transaction form fabricated as a pad in the form of a stack of downwardly vertically offset transaction record write-on sheets. Each sheet contains a number of contiguous tear-off record slips placed over transfer means, typically in the form of a carbon paper sheet, and joined along a common edge preferably at aligned bottom margins thereof to at least one underlying master transfer record sheet. Each slip has an exposed record entry area at the upper margin thereof. The uppermost slips on each of the individual downwardly vertically offset record write-on sheets have their exposed record entry areas disposed to overlie a corresponding record entry area of the underlying master record sheet. Transaction numbers are provided on the various tear-off slips in the numerical order in which they are to be filled in and torn from the pad, and are in correspondence with pre-printed numbers on the underlying master record sheet. The various tear-off slips are removed serially starting with the uppermost tear-off slip of the bottommost write-on sheet and proceeding with the uppermost tear-off slips of the sheets immediately above the same. The record entry area of the next slip in the series will always be exposed for access, and will always be in immediate contact with the carbon paper.

By properly distributing the transaction numbers among the various slips of the various sheets, and by offsetting each sheet sufficiently to expose the record entry area of the topmost slip in the next underlying sheet, a record keeping pad is produced which can readily be manufactured from a plurality of webs of contiguous record sheets having appropriately positioned tear-off slips printed thereon. Individual emplacement of individual slips on the master record sheet is completely eliminated, resulting in significantly decreased manufacturing costs.

For example, a transaction record pad having provision for twenty record entries can be fabricated from only five write-on record sheet webs, as contrasted with the twenty individual slips necessary for hand assembled or less efficient automated production of similar record-keeping forms as described in the Background of Invention.

It should be further recognized that in its broadest aspects the instant invention is not restricted to the manufacture of transaction record pads having numbered record entry areas, but is broadly applicable to the manufacture of any record-keeping pad wherein sequential user-entered information must be entered simultaneously on a number of tear-off record slips and on an underlying master record sheet.

According to the invention, one or more preferably pre-printed rolled webs forming the master record sheets of different transaction forms, one or more rolled webs of carbon paper and preferably pre-printed rolled webs of progressively varying widths forming the write-on record sheets of different transaction forms are unwound and, superimposed in proper offset relation. (Binding adhesive is applied along the margins of the superimposed webs which are to form the attached margins of the sheets,) the webs are brought together and then transversely cut to deliver completed forms at high web feeding speeds at the end of the fabricating line. According to a specific feature of the method the webs are pre-printed at a series of printing stations in such a way as to replicate indicia which is invariant from one pad to the next on a given web at a first station, to replicate additional pad-to-pad invariant indicia and a second color at a second station, and are finally printed with indicia which varies from one pad-forming region of the web to the next at a third station.

The just described and other features of the invention will become apparent upon making reference to the following drawings, specification and claims.

BRIEF DESCRIPTION OF DRAWINGS

FIG. 1 is an exploded view showing various elements of the sheets comprising a single pad of a unique product made by the present method and showing the appropriate registration of these elements with respect to each other.

FIG. 2 shows a representative tear-off slip carried in contiguous form on the upper sheets shown in FIG. 1.

DETAILED DESCRIPTION

There is described in detail preferred embodiments of a product made by the present method invention, with the understanding that the present disclosure is to be considered as an exemplification of some of the products are manufacturable by the invention and is not intended to limit the broad aspect of the present method invention to the embodiment illustrated.

Figure 9:
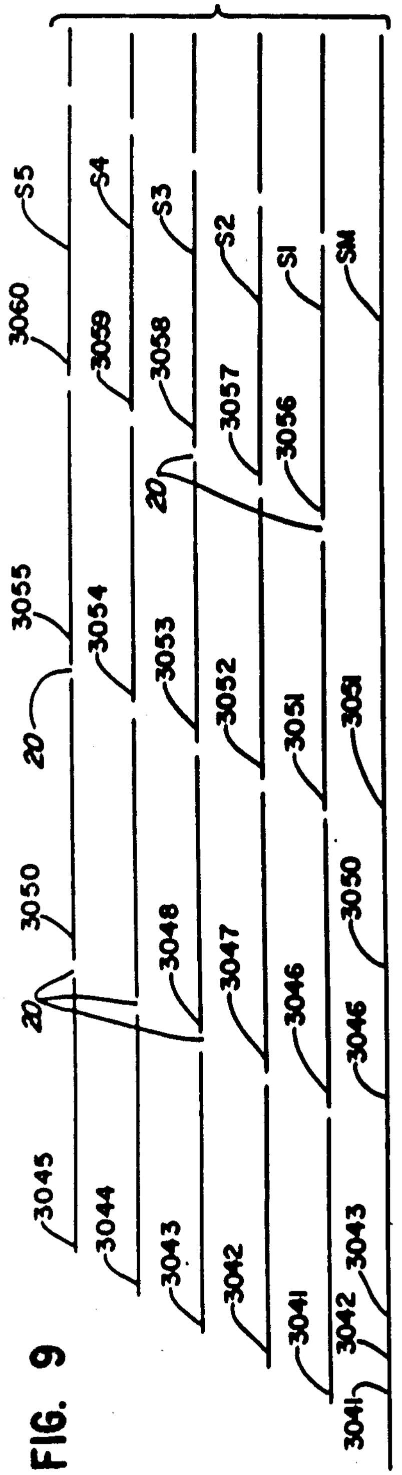
FIG. 9 is a schematic edge view of the exploded pad shown in FIG. 1.

Referring now initially to FIGS. 1-9, FIG. 2 shows a representative tear-off slip 12 having a record entry area 14 marginally disposed thereon and data entry requests 13 printed thereon, the record entry area having a transaction number TN "3060" printed at the left-hand edge. FIG. 1 shows in exploded form how such slips 12 are assembled together, FIG. 9 showing in schematic form the registration of the various sheets. FIGS. 3-8 show sequential record entries on various slips and the results of the removal thereof. The detailed structure of indicia shown in FIG. 2 has been deleted for purposes of clarity. With particular reference to FIG. 1 it will be noted that the lowermost element in the pad assembly 10 is a master transfer record sheet SM having a plurality of rows 16 extending thereacross. On the leftmost edge of each of the rows 16-16 are entered sequential transaction numbers TN-TN as shown. A carbon sheet SC is emplaced over the master record sheet SM, and its length is such as to expose a narrow identifying portion at the upper edge 18 of the master record sheet SM. Any user-chosen indicia may be pre-printed along this upper edge 18 of the master record sheet SM.

Overlying the master record sheet SM and carbon paper SC are, in the example shown, five write-on record sheets S1-S5. Each of the write-on record sheets S1-S5 has four tear-off slips 12 imprinted thereon, each tear-off slip having a record entry area 14 similar to that shown in FIG. 2 printed thereon. It will be noted that each sheet thus contains four contiguous tear-off slips 12 separated by perforation lines 20 which allow the individual tear-off slips to be detached from each other. The record entry areas 14 on each tear-off slip are configured to be congruent with the underlying rows 16-16 of the master record sheet SM. Hereinafter each tear-off slip 12 and each row 16 of the master record sheet SM will be denoted by the transaction number shown thereon in the drawings.

Thus, considering first the lowermost write-on record sheet S1, it will be noted that the uppermost record entry area 3041 is emplaced over row 3041 of the master record sheet SM. Record entry areas 3046, 3051, and 3056 are similarly congruent with their corresponding row numbers on the master record sheet SM. Considering the next sheet S2, this sheet is offset downwardly with respect to sheet S1 to place its record entry area 3042 immediately adjacent the record entry area 3041, and thus immediately over row 3042 of the master record sheet SM. Its associated tear-off slips 3047, 3052, and 3057 are similarly in registry with their associated rows of the master record sheet SM. Sheet S3 is similarly offset to place its record entry area 3043 immediately adjacent record entry area 3042, and thus in registry with master record sheet record entry area 3043. Sheets S4 and S5 are similarly staggered so that their respective record entry areas 14 are in proper registry over the correspondingly numbered rows 16 of the master record sheet SM. It will be noted that the series of write-on record sheets S1-S5 are of progressively shorter length from bottom to top, but that the tear-off slips 12 are all of identical dimension. The pad so formed is held together at the bottom edges 22 by glue stripes 24-24 (FIG. 9).

Figures 3, 4, 5, 6, 7, 8:
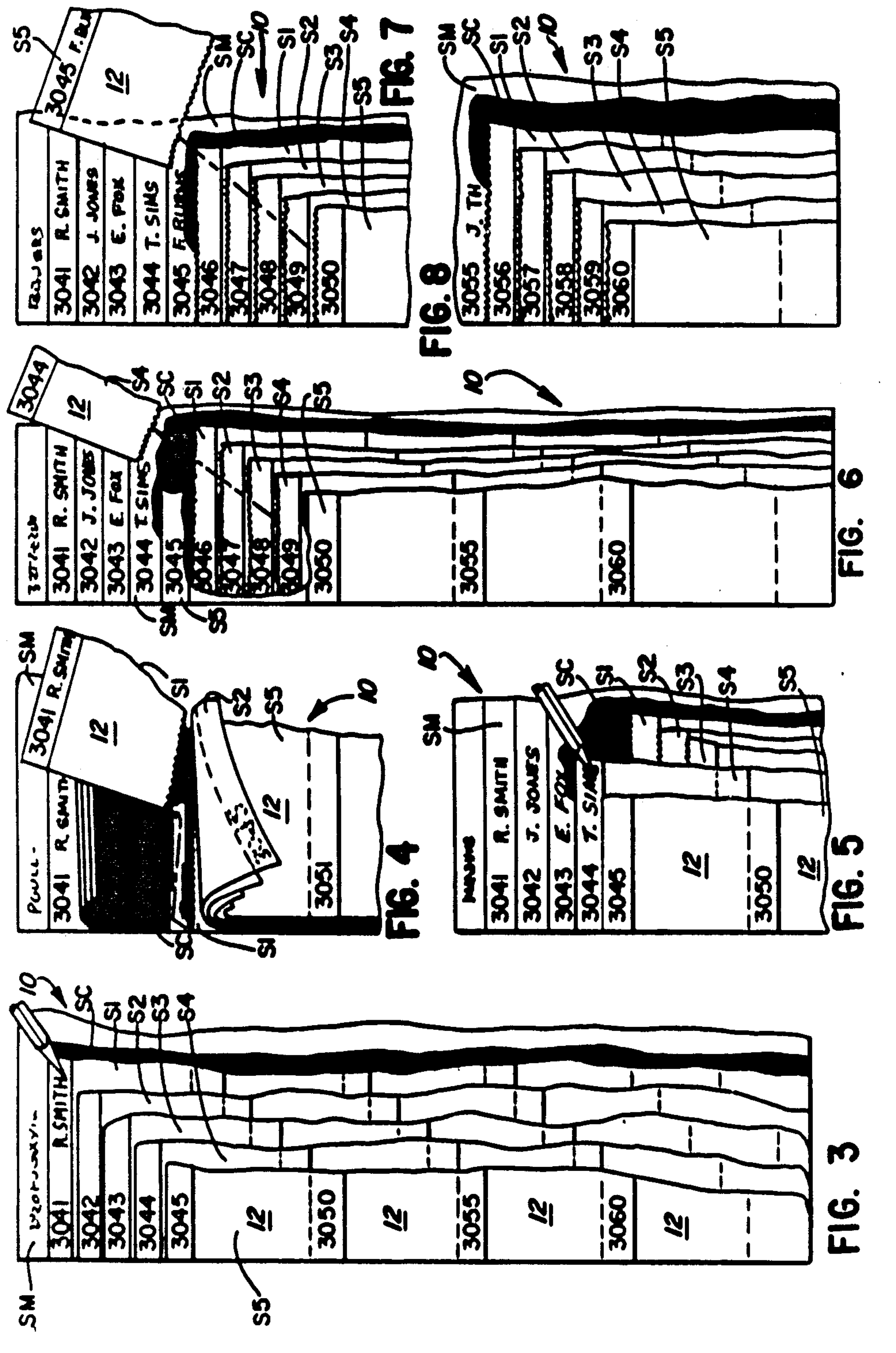
FIG. 3 is a partial cut-away view of a pad manufactured by the method of the invention showing initial record entry in the earliest numbered tear-off slip.
FIG. 4 is a view similar to FIG. 3, but showing the underlying replicated indicia when the slip on which the entry was made in FIG. 3 is removed.
FIG. 5 is a view similar to FIG. 3, but shows the state of affairs when entries are made on the fourth slip of the series.
FIG. 6 shows exposure of the next slip in the series upon removal of the slip on which entry was made in FIG. 5.
FIG. 7 shows the state of affairs when next slip has been removed after the removal indicated in FIG. 6.
FIG. 8 shows the pad at a much later state of slip removal.

FIGS. 3-8, show the sequence of record entry and slip removal in proper sequence, and the sequential changes in the appearance of the master record sheet SM as a result thereof. FIG. 3 shows the initial entry being made on the topmost tear-off slip 3041. FIG. 4 shows the effect of detachment of tear-off slip 3041, showing that the entry thereon has been replicated by the carbon sheet SC in row 3041 of the master record sheet SM. In all subsequent views the carbon paper is shown partially cutaway where appropriate for illustrative purposes; however, in the preferred form of the invention the carbon sheet SC remains in the form of a large sheet held in place until the last tear-off slip 3060 has been removed, whereupon it may be discarded.

FIG. 5 shows the result of entry of data into, and removal of, tear-off slips 3041-3043 inclusive, showing the appearance of the pad 10 ready for record entry onto tear-off slip 3044. FIG. 6 shows the pad 10 after tear-off slip 3044 has been removed, leaving the top tear-off slip 3045 of sheet S5 ready for the next entry. FIG. 7 shows the effect of removal of tear-off slip 3045 from top sheet S5, resulting in the exposure of underlying tear-off slips 3046-3048 for subsequent record entry thereinto.

Thus, it will be seen that by using properly staggered tear-off slips the proper sequence of slips is exposed to lie immediately adjacent to the carbon sheet SC for record entry and transfer. With tear-off slip 3045 removed as shown in FIG. 7 a state of affairs similar to FIG. 3 is shown, but with tear-off slips 3046-3050 presented simultaneously instead. The foregoing steps are then repeated until all of the tear-off slips 3041-3060 have been removed, whereupon the carbon sheet SC and the remnants of the write-on record sheets S1-S5 may be torn free, leaving the consolidated information of the various transactions permanently recorded on the master record sheet SM in condition for subsequent referrals.

It will also be noted with reference to FIG. 1 that the carbon sheet SC may be configured to have its replicating material confined as a length-wise-running strip overlying the corresponding strip-shaped region of the master transfer record sheet SM so that entries made in the record entry areas 14 will be properly recorded on the master record sheet SM, and so that user entries made on the rightmost portions of the tear-off slips 12 will not be replicated onto the master transfer record sheet.

Thus, it has proven possible by appropriate staggering transaction numbers and tear-off slips to employ a relatively small number of sheets per pad to provide a less fragile pad than the shingle-like edge-joined pads of the prior art and described in the Background of Invention. It has also proven possible to make a pad having all of the capabilities of the prior art system, but which is much more easily manufactured, as will next be shown.

Figure 11:
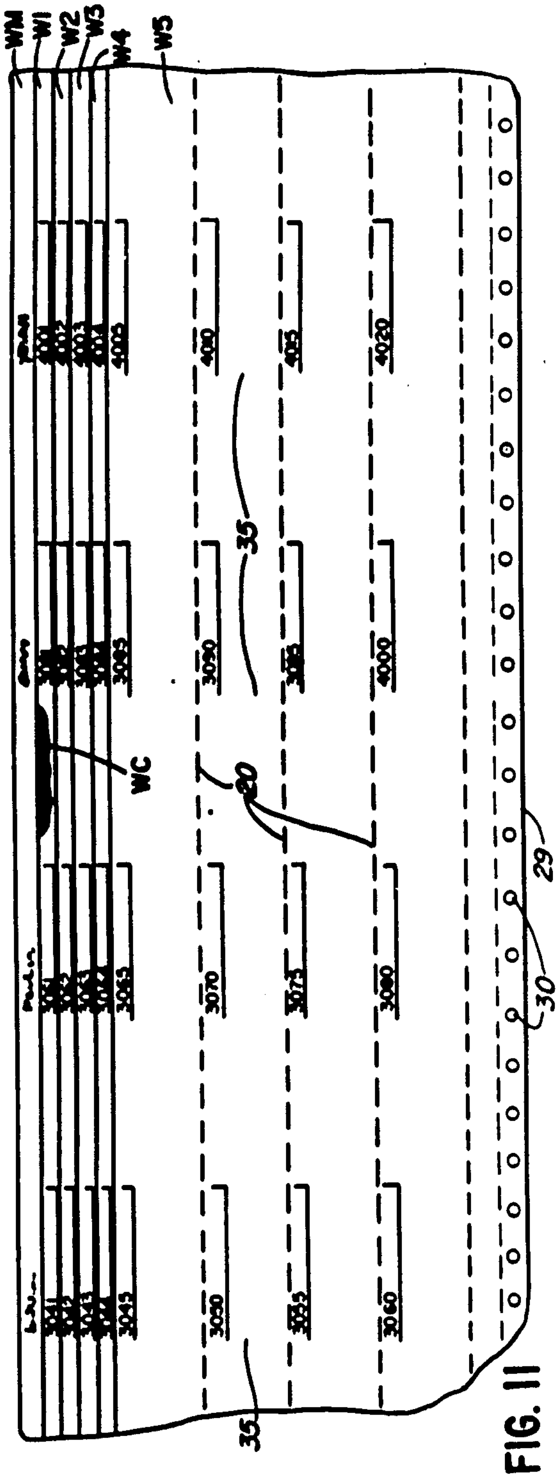
FIG. 11 shows the general arrangement of indicia on the webs shown in FIG. 10.
Figure 10:
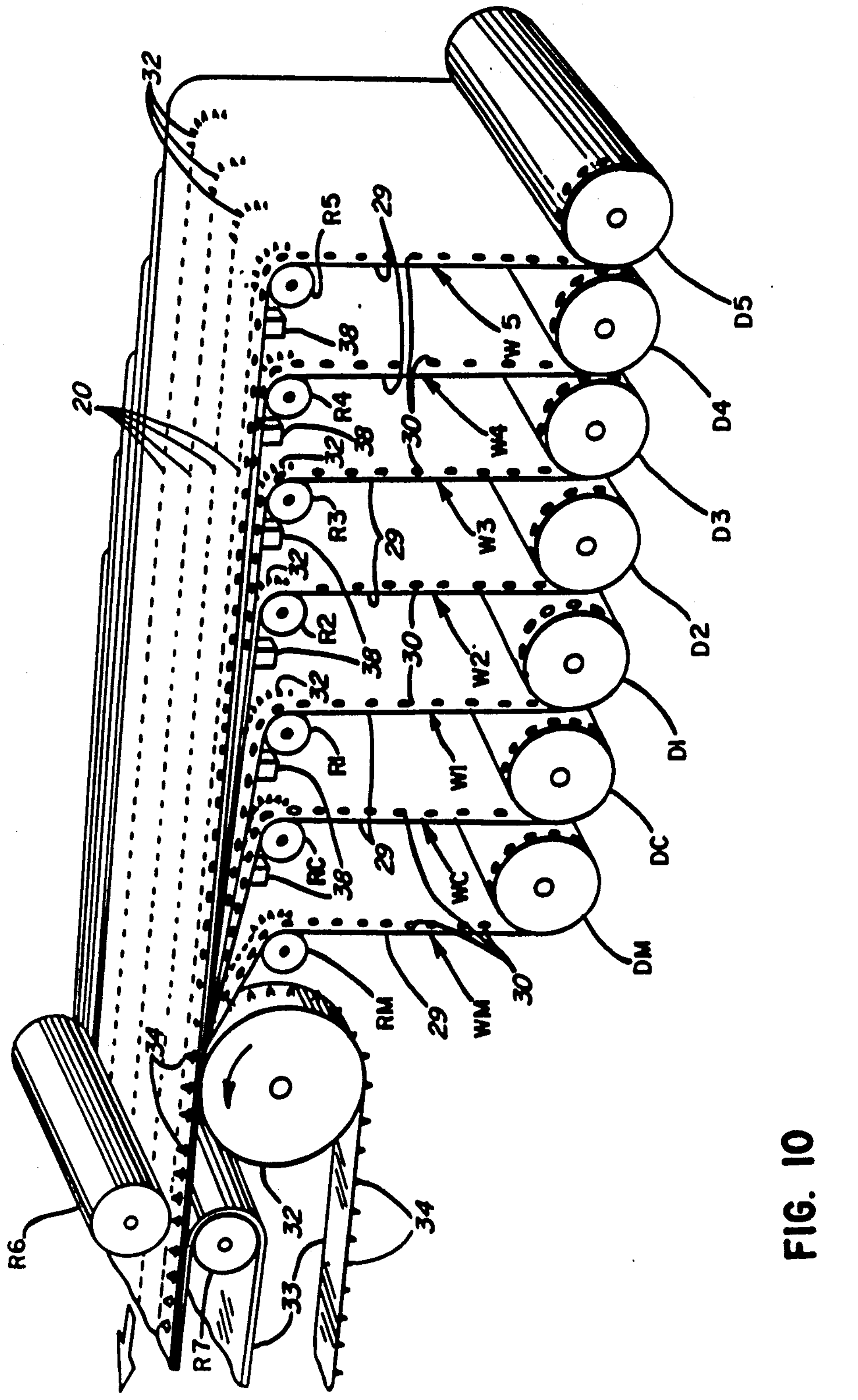
FIG. 10 is a generally schematic perspective view of a multi-web collator for preparing record keeping pads to be made by the instant invention from contiguous webs.
Figure 14:
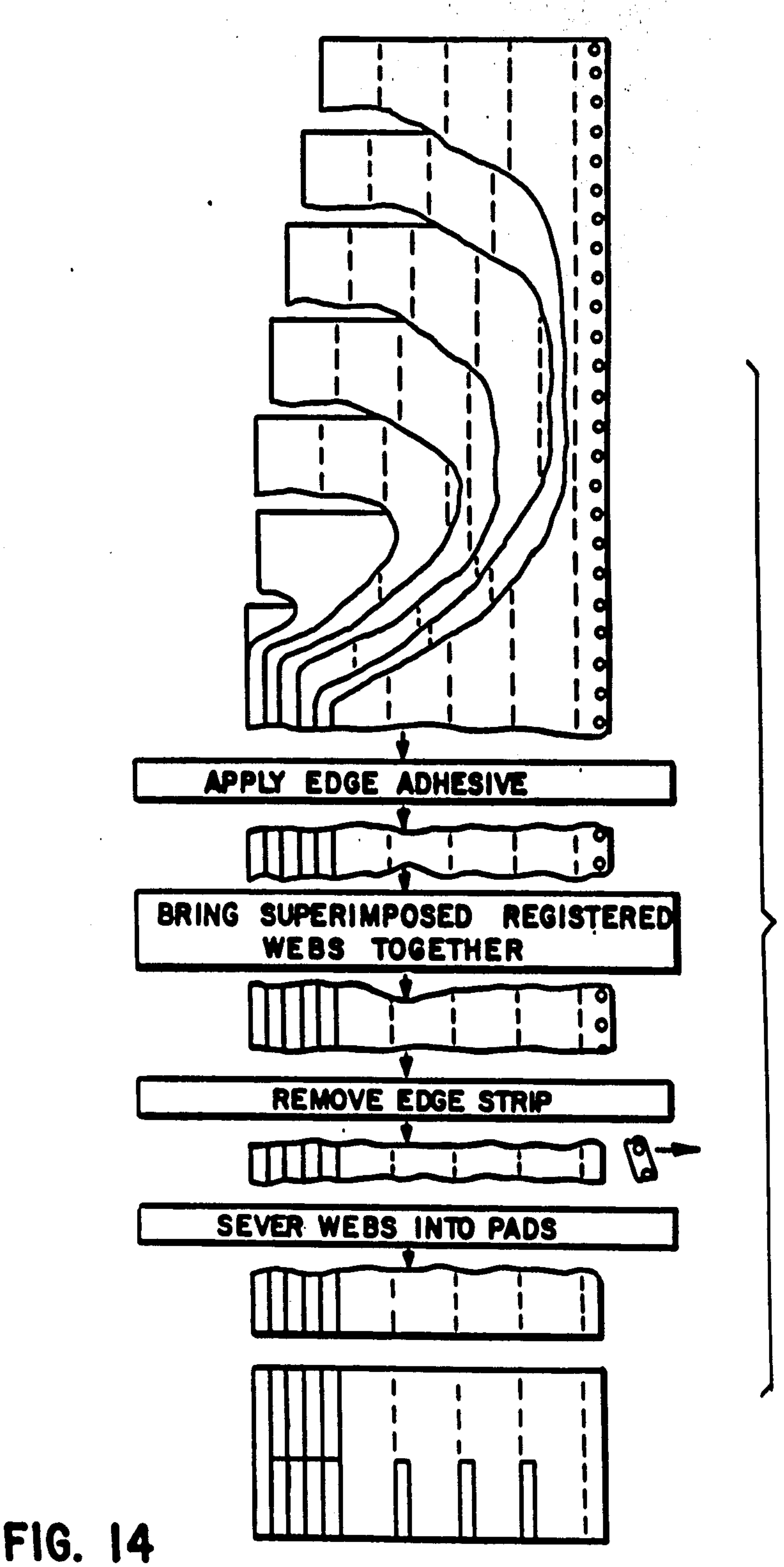
FIG. 14 is a generally schematic flow chart of the collating process forming part of the present method invention.

FIG. 10 shows in generally schematic form a representative collating system for producing such pads by mass-production methods. FIG. 14 is a generally schematic flow diagram of the collating process. As shown in FIG. 10, master record sheets WM, carbon sheets WC, and write-on record sheets W1-W5 are provided pre-printed in web form and dispensed from dispensing rollers DM, DC, D1-D5 respectively. FIG. 11 shows the general orientation of the indicia on the various webs, showing that sequential pads are fabricated in side-by-side arrangement with the record entry rows, e.g. 3041, 3042, 3043, etc. oriented along the axis motion of the webs. The indicia have been deleted from FIG. 10 and 11 where necessary for purposes of clarity.

At a common edge 29 of each web there are provided indexing holes 30. Each web is passed over an associated roller RM, RC, R1-R5 respectively. To provide the desired perforations 20, rollers R1-R5 are provided with slitting elements 32. As will be seen in FIG. 11, the webs are brought into contact and passed a over a drive roller 32 driving an indexing belt 33 having indexing pins thereon configured to aligningly engage the indexing holes 30 in the webs so as to provide proper registry. It will be noted that the webs W1-W5 are progressively shorter, corresponding to the progressively shorter write-on record sheets S1-S5 shown in FIG. 1. (Glue applicator nozzles 38 (symbolically) (shown) apply a narrow strip of adhesive along the edges 29 carrying the indexing holes 30 to bind the webs together.) The registered webs are pressed together between a pair of rollers R7 and transported on a conveyor belt 33 for further processing, including slitting to remove the hole-bearing edge 29 of the webs, transversely cutting the web assembly along cut lines 35 (FIG. 11) by a cutoff knife and finally delivery to a collection station. Optional transverse perforations may be supplied to the web by the structure carrying the cutoff knife.

In comparison with the previously recited prior art shingle-type pads, it will be noted that in the present case it is possible to make a pad capable of recording twenty transactions using only five webs to carry the tear-off slips, whereas the shingle-type pads would require a total of twenty such webs, resulting in an inordinately complicated machine. The present system is thus clearly superior from the standpoint of economics.

Figure 12A:
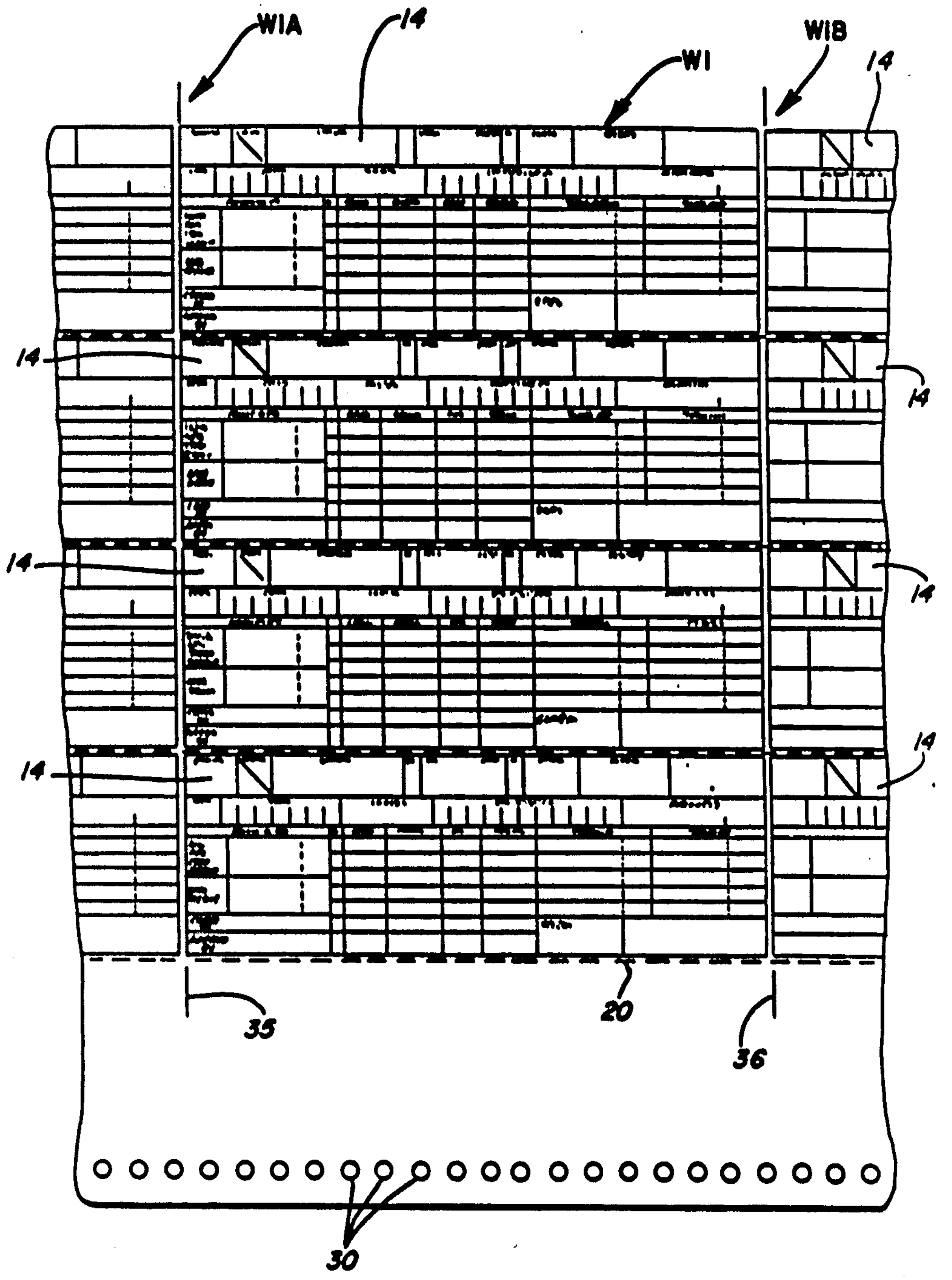
FIGS. 12A, 12B, 12C and 13 are fragmentary views of web portions showing the steps in pre-printing indicia on the webs shown in FIGS. 10 and 11.
Figures 12B, 12C:
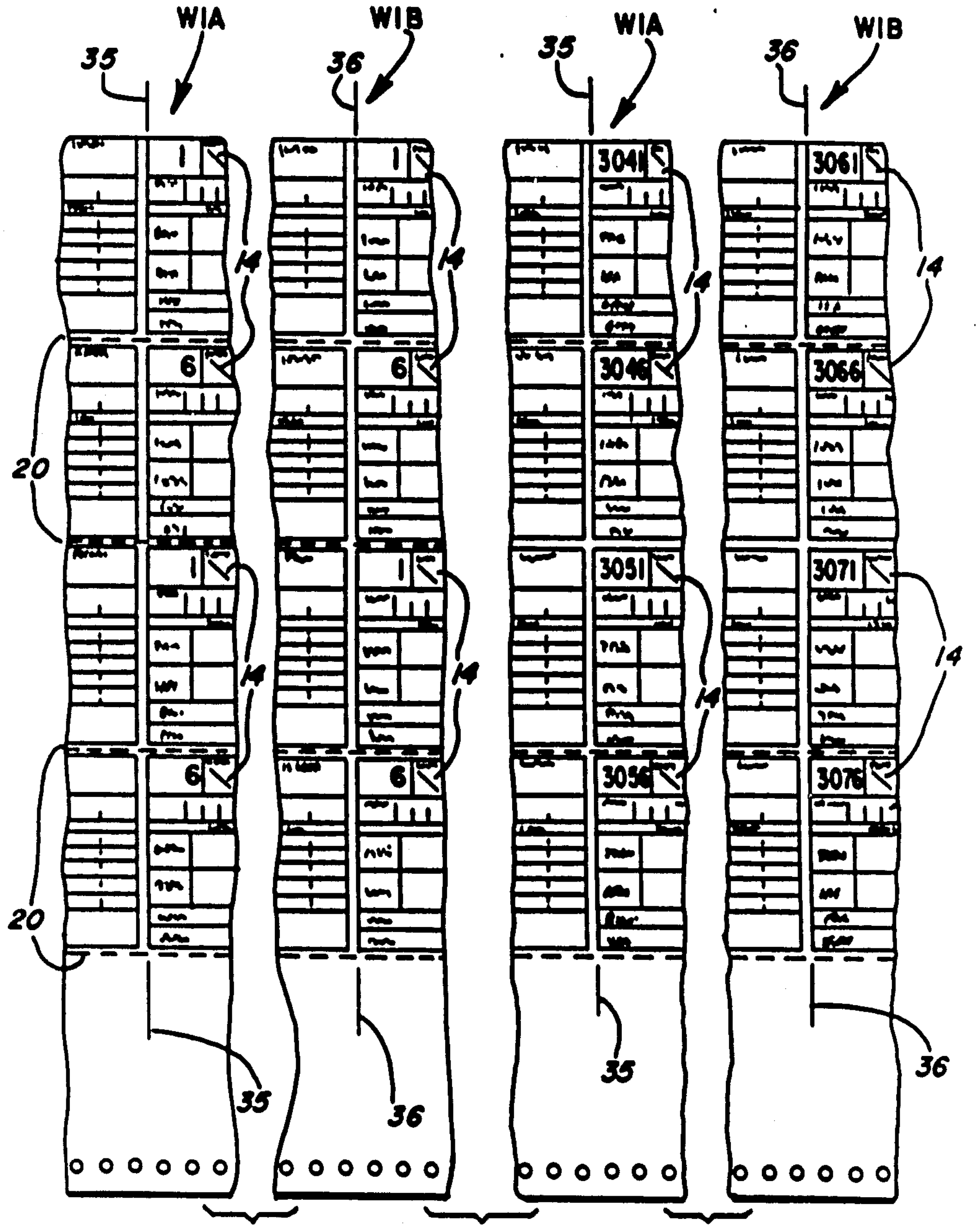
Figure 15:
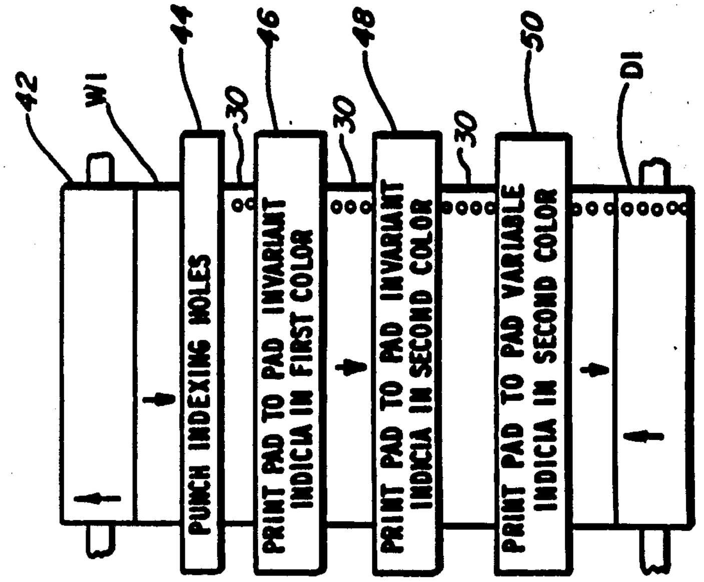
FIG. 15 is a generally schematic view of the pre-printing process forming part of the present method invention.

The webs WM, W1-W5 may be preprinted at a series of stations in a manner which efficiently utilizes the informational redundancy between the various elements of the printed indicia. FIG. 15 is a generally schematic diagram of the printing process. FIGS. 12A-12C show the phases of printing web W1. Thus, considering FIGS. 2 and 11, printing of, for example, web W1 carrying side-by-side write-on record sheets may be done in a given color so as to replicate the pad-to-pad-invariant indicia. The cut lines 35 shown in FIG. 11 are also shown in FIGS. 12A-12C for purposes of clarity. (As schematically shown in FIG. 15 web W1 is dispensed from a roller 42 to pass through a punching station 46 which punches the indexing holes 30 at one margin of the web, (after which) the pad-to-pad-invariant indicia are imprinted thereon.) As will be seen from FIG. 12A, these take the form of indicia which do not change from one tear-off slip to the next, either laterally or transversely. In the example shown, this first printing phase replicates all of the markings on web W1 with the exception of the transaction numbers.

It will further be noted with respect this initial printing of the write-on record sheet webs W1-W5 that an identical print roller may be used; however, the width of the web stock must be chosen to be in accordance with its requisite width, according to which of the five write-on record sheets S1-S5 is to be printed thereon.

At a second printing station the pad-to-pad invariant terminal transaction number digits, for example, terminal numbers 1 and 6 on web W1 carrying write-on record sheets S1 shown in FIG. 1 are added in a second color in the leftmost end of the record entry areas 14. FIG. 12B shows these portions of the record entry areas 14 having the terminal digits printed thereon, these fragmentary views showing portions W1A and W1B immediately on either side of the cut lines 35 and 36 of FIG. 12A. Finally, customized (non-repeating) numbers are printed as a third station 50 in the second color, entering, for example, on web W1 the lead digits 304 and 305, subsequently followed immediately thereafter by lead digits 306 and 307 as shown in FIG. 12C. It will be noted from FIG. 12C that these lead digits replicate from one pad-forming area (e.g. W1A) to the next (e.g. W1B) in the incrumental sequences 304, 306, 308 and 305, 307, 309. (Printing of such sequential digits may be accomplished by means of synchronized incrementing digit printing units well known in the art.) Finally, the web W1 is wound up on a roll D1, i.e. the dispensing roll D1 shown installed collator as shown in FIG. 10.

Figure 13:
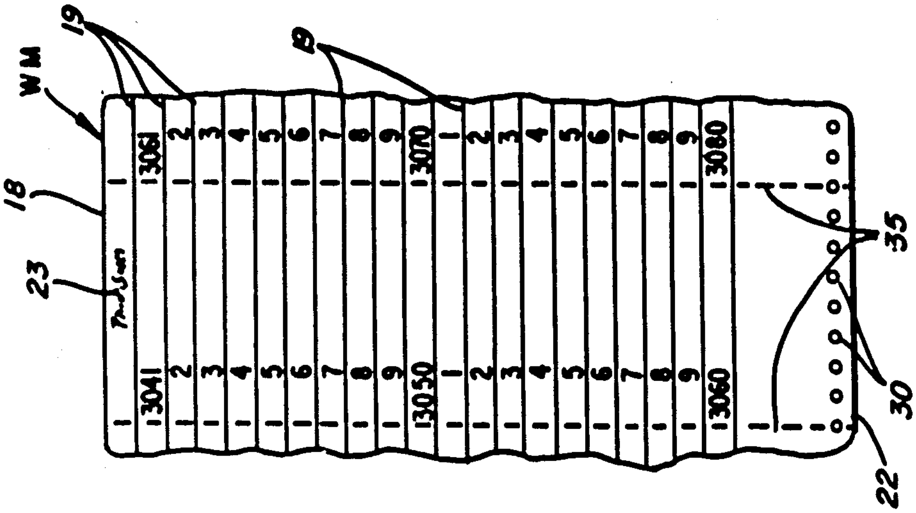

With respect to the printing of the master record sheet web WM, reference to FIGS. 1 and 11 shows that the terminal digit string running from top to bottom in the sequence 1, 2 . . . 8, 9, 0, 1, 2 . . . 8, 9, 0 is present on every pad; hence these terminal digits, along with record entry row boundaries 19 may similarly all be printed at the same time at the first station 46. Additionally, customer-particularized indicia 23 may be entered at the upper margin of the master record sheet as well. Either the digits or the customer-particularized indicia may be entered in a second color at the second station 48. Finally, the numbers 304, 305, 306, 307, and 308 are printed at the third station 50. In the variation shown in FIG. 13 intermediate digits for such numbers, as for example, 3042-3049 and 3051-3059 are not entered, since they are rot necessary to the understanding of the final record. The sheets so printed are then ready for collating.

While the present method invention has been described with reference to a preferred embodiment thereof, it will be understood by those skilled in the art that various changes may be made and equivalents may be substituted for elements thereof without departing from the broader aspects of the invention. Also, it is intended that broad claims not specifying details of a particular method embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. A method for mass producing transaction record-keeping forms each configured for recording a series of transactions and having a master transfer record sheet having a plurality of record entry areas printed thereon and arranged in parallel rows extending in a given direction, a plurality of write-on transaction record sheets of progressively varying size and disposed as a stack on and secured to said master record sheet along a given common marginal attachment edge so that a set of corresponding unattached margins of the stack are displaced in said given direction to expose the record entry areas thereat, each write-on record sheet having a plurality of contiguous coplanar edge-joined tear-off record slips spaced apart in said given direction and having severance lines delineated at their contiguous margins, each slip having at the margin thereof closest to said unattached margin of the write-on record sheet on which it is formed a record entry area having data requesting indicia and which will be exposed by sequential removal of each record slip closest to said unattached margin, said slips being so positioned on this associated write-on record sheets that during said sequential removal the record entry area of the slip closest to said unattached margin will be immediately adjacent said master record sheet, said form having transfer means for replicating onto said master transfer sheet the user-impressed indicia entered on the record entry areas of slips immediately adjacent said master transfer record sheet, said method comprising the steps of:

printing on longitudinally spaced areas of a master web the record entry areas of the master transfer record sheets for a plurality of said transaction record-keeping forms, said master sheet record entry areas being disposed in parallel rows extending along the longitudinal direction of said master web;

providing said transfer means for replicating on said master transfer record sheet user impressed indicia;

printing on longitudinally spaced areas of each of a plurality of write-on record sheet-forming webs of progressively decreasing widths the slip record entry areas of a different one of said record sheets of said forms, the slip record entry areas of each write-on record sheet forming web being offset in a direction transverse to said longitudinal direction by a different distance from common generally aligned longitudinal web edges to expose slip record entry areas along the opposite longitudinal edges of said write-on record sheet-forming webs formed by the first of the slips to be torn off;

bindingly attaching said webs so that master record sheet and said write-on record sheets are attached along said common web edge so that the corresponding sheets which are to form said respective forms are in proper alignment; and transversely cutting said webs to separate the individual transaction-record keeping forms into pads.

2. The method of claim 1 wherein said webs are initially unprinted webs wound on various rolls, said method includes the steps of unwinding of said unprinted rolls of webs and printing on the unwound portion of said webs indicia required to form a master record and write-on sheets, following which the webs are overlapped, registered, attached, and transversely cut to form separate record-keeping forms.

3. The method of claim 2 wherein said printed webs are re-rolled and then subsequently unwound, overlapped, registered, attached, and transversely cut.

4. The method of claim 2 or 3 wherein said step of printing indicia on said webs includes sequential printing at a plurality of sequential printing stations including imprinting in a first color at a first station indicia which are invariant from one pad to the next, and printing indicia which vary from one pad to the next at at least one additional station.

5. The method of claim 4 wherein the indicia printed at at least one of said additional stations are printed in a second color.

6. The method of claim 4 wherein each of said slip record entry areas has a unique transaction-identifying number printed thereon, and each of said master transfer record sheet record entry areas has printed thereon the number printed on the overlying tear-off slip record entry area, and said numbers are ordered in numerical sequence in the order in which the slips are to be torn from the various write-on record sheets.

7. The method of claim 6 wherein said indicia which are invariant from one pad to the next includes at least one digit of each transaction-identifying number.

8. The method of claim 7 wherein the remaining digits of said transaction-identifying numbers are printed at at least one of said additional stations.

9. The method of claim 2 wherein said at least one terminal digit is printed at a first additional station and said remaining digits are printed at a second additional station.

10. The method of claim 9 wherein all of said digits are printed in a second color.

11. The method of claims 1, 2 or 3 wherein said transfer means are provided in the form of a web of material containing carbon paper on at least a portion thereof and disposed between said master second sheet web and the record sheet web closest thereto.

12. The method of claim 1 or 2 wherein a series of indexing holes are punched along one margin of said webs prior to the printing of indicia thereon, and movable indexing means are provided for engaging said holes to maintain registry of overlapped webs.

13. The method of claim 1 wherein on said forms so produced said master transfer record sheet record entry areas extend in rows parallel to and descending from an unattached edge of said master transfer record sheet, and each slip record entry area extends in a direction across the slip along the margin thereof closest to said unattached master transfer record sheet edge.

14. The method of claim 3 wherein said write-on record sheets are successively offset from said unattached edge with the topmost sheet offset farthest from said unattached edge, so as to expose their respective slip record entry areas closest to said unattached edge.

15. The method of claim 11 wherein said transfer means is disposed to permit user entry of indicia on portions of said slips without making a replica thereof on said master transfer record sheet.

16. The method of claim 12 wherein said series of indexing holes are punched prior to the passage of said webs towards a printing station.

* * * * *